(12) United States Patent
Moccagatta et al.

(10) Patent No.: US 12,524,326 B2
(45) Date of Patent: Jan. 13, 2026

(54) GENERATION OF VALIDATION TEST SUBSETS TO PROMOTE EFFICIENT VALIDATION OF VIDEO CODECS

(71) Applicant: Intel Corporation, Santa Clara, CA (US)

(72) Inventors: Iole Moccagatta, San Jose, CA (US); Victoria Chiu, Rancho Cordova, CA (US); Rajini Dasyam, Folsom, CA (US); Tao Li, San Jose, CA (US); Yumin Pan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/677,139

(22) Filed: Feb. 22, 2022

(65) Prior Publication Data

US 2022/0182600 A1 Jun. 9, 2022

(51) Int. Cl.
*G06F 11/3604* (2025.01)
*H04N 19/42* (2014.01)
*H04N 19/85* (2014.01)

(52) U.S. Cl.
CPC ......... *G06F 11/3604* (2013.01); *H04N 19/42* (2014.11); *H04N 19/85* (2014.11)

(58) Field of Classification Search
None
See application file for complete search history.

(56) References Cited

U.S. PATENT DOCUMENTS

| | | | | |
|---|---|---|---|---|
| 2009/0265689 A1* | 10/2009 | Gooi | ..................... | G06F 11/366 717/124 |
| 2010/0192128 A1* | 7/2010 | Schloegel | ........... | G06F 11/3684 717/125 |
| 2010/0287534 A1* | 11/2010 | Vangala | .............. | G06F 11/3612 717/124 |
| 2011/0258601 A1* | 10/2011 | Ndem | ................. | G06F 11/3676 717/124 |
| 2014/0137057 A1* | 5/2014 | Tzoref-Brill | ........ | G06F 11/3676 716/107 |
| 2015/0220425 A1* | 8/2015 | Yoshida | .............. | G06F 11/3684 717/124 |
| 2023/0005509 A1* | 1/2023 | Mendel | ................ | G11B 27/034 |

* cited by examiner

*Primary Examiner* — Qing Chen
(74) *Attorney, Agent, or Firm* — Hanley, Flight & Zimmerman, LLC

(57) ABSTRACT

This disclosure describes systems, methods, and devices related to enhanced validation of video codecs. A device may receive validation results for a video codec using a first computer programming language, the validation results indicative of invocations of functions and conditions of the code; identify, from the validation results, a first validation test that invoked a first function or condition of the code; identify, from the validation results, a second validation test that invoked the first function or condition of the code; determine, from the validation results, that the first validation test and the second validation test overlap in invoking the first function or condition of the code using the first computer programming language; and generate, based on the overlap, a first subset of the validation tests with which to validate code of the video codec using a second computer programming language.

20 Claims, 5 Drawing Sheets

GENERATION OF VALIDATION TEST SUBSETS TO PROMOTE EFFICIENT VALIDATION OF VIDEO CODECS

TECHNICAL FIELD

This disclosure generally relates to systems and methods for video coding and, more particularly, to validating video codecs.

BACKGROUND

Video coding can be a lossy process that sometimes results in reduced quality when compared to original source video. Video coding standards are being developed to improve video quality and to foster interoperability. As video codecs add features and increase in complexity, validation of video codecs becomes more challenging. In particular, because some video codec features may overlap, video codec validation may become more inefficient as the number of video codec features grows exponentially.

DETAILED DESCRIPTION

Figure 1:
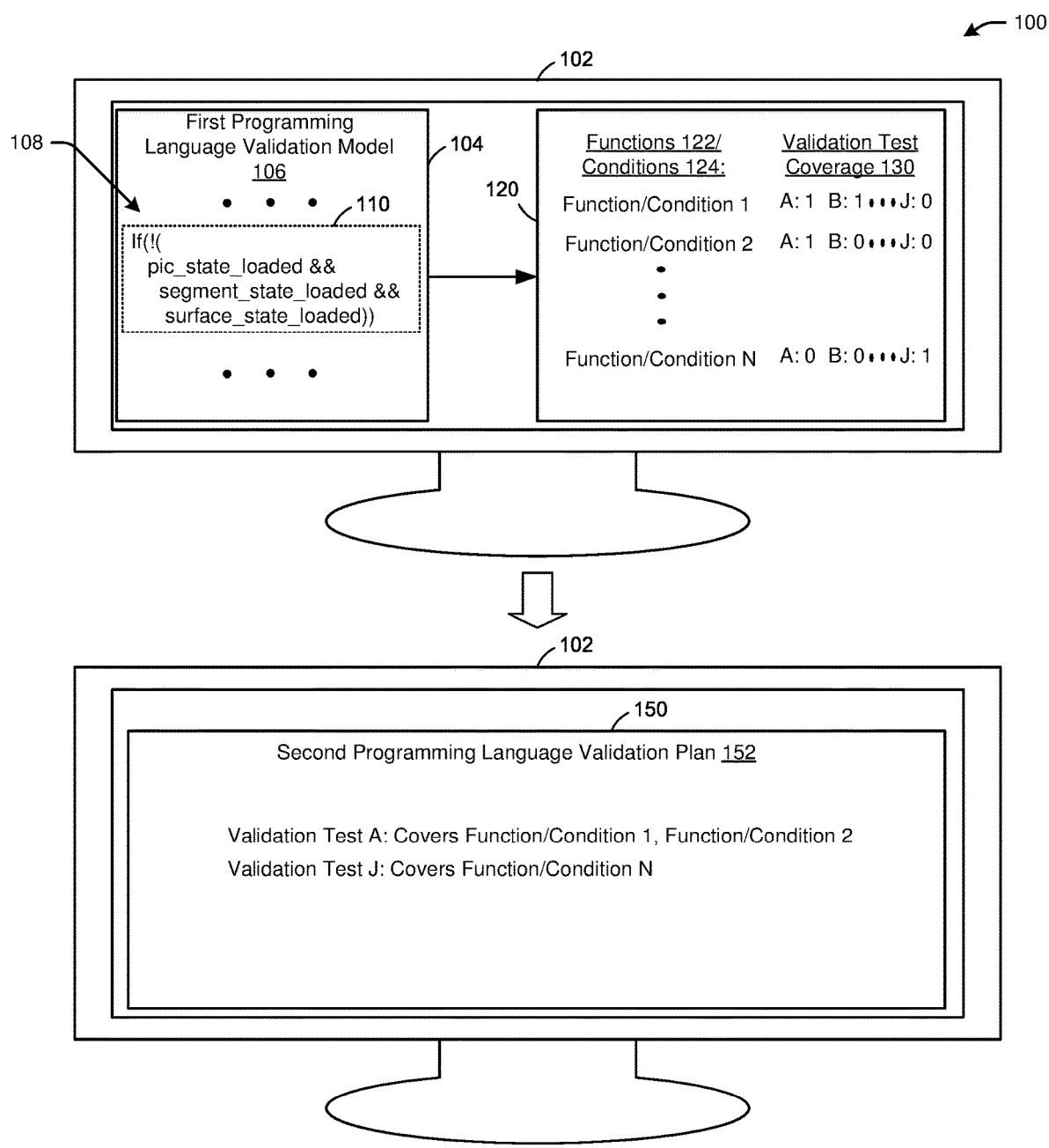
FIG. 1 is an example system for enhanced validation of video codecs, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Video codecs used by encoders and decoders may include a lot of computer code to represent many features. For example, a previously encoded video frame may be used as a reference for encoding a subsequent video frame. Multiple motion vectors may be used per pixel macroblock. Discrete cosine transforms (DCTs) may be used in video coding. Different transform sizes and transform adaptability may be applied. These are just a few examples of video codec features. There are many video coding standards, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Each video coding standard has many features in its code.

Validation of video codec features is important to assess, for example, the coverage of functions in the code and the coverage of conditions in the code. Function coverage may refer to whether or not a function of the code was invoked. Condition coverage may refer to whether every condition or decision (and corresponding outcome) was invoked in the code.

Because video codecs and their bitstreams may include many features (e.g., bitstream functionality), some of the features may overlap, and therefore some validation tests for those features may overlap. For example, some video code features may invoke a same function and/or decision. Therefore, validating video codecs may include executing tests for coverage and/or decisions that evaluate the same code, resulting in wasted time and computer resources due to the redundancies. One modification to the computer code of a video codec may require re-validating the entire code of the video codec.

For media decoders and codecs, hardware, software, and hybrid Internet Protocol (IP) validation and testing may include execution of many tests that may overlap in terms of which video codec features they cover. In addition, some validation tests may use large resolution, length, and numbers of samples, requiring the validation tests to be run in emulation (e.g., using field programmable gate arrays—FPGAs), using significant computer resources and causing testing delays.

For example, a C-language model may be used to validate video codec code by executing validation tests to determine function and condition coverage of the video codec code (e.g., which functions and conditions are invoked or not by the validation tests). Requiring all validation tests to be executed in a test suite for both C-model release and RTL regression may slow down the RTL release/verification, and also may increase the chance of a C-model failure caused by reasons not related to or not relevant to RTL. For example, a very high spatial resolution test can cause C-model to run out of memory and crash. The resources spent to fix the crash are wasted because the crash is not related to a feature implemented in RTL, and still the crash needs to be fixed in order for the test to be used for RTL validation. Reducing the number of validation tests therefore may impact the speed and quality of video codec or other software validation, reduce computer resources, and may accurately identify coverage gaps.

There is therefore a need for enhanced validation of video codecs that maximizes the validation testing coverage while minimizing inefficiencies caused by overlapping codec features.

In one or more embodiments, feature validation tests may be executed in a higher-level computer language (e.g., C, C++, etc.) in order to determine which validation tests to be executed for video codec code written in a lower-level language (e.g. RTL—register transfer language). A system may extract a minimum set of coverage points from a coverage report of video codec software. Any bitstream may have a coverage report (e.g., 100 bitstream may result in 100 coverage reports). Not every coverage point may be included in every coverage report, and some coverage reports may have the same coverage points as one another. The coverage report may indicate which coverage points are covered by respective validation tests. The minimum set of coverage points may require that all functions and conditions of the video codec code be tested, or may define a preferred set of features that may be a subset of all features of the video codec code (e.g., some coverage loss for certain features may be tolerated). The system may select for execution the validation tests that validate the minimum set of coverage points from the video codec code to provide the maximum desired coverage for the video codec code. When validation tests overlap in coverage (e.g., test the same function and/or decision of the video codec code), the system may select one of the overlapping validation tests over any others that overlap in coverage. The selection may be arbitrary and/or based on other factors, such as how many features are covered by the validation test.

In one or more embodiments, a system may reduce the number of video codec validation tests without coverage loss, and may identify validation tests with preferred features (e.g., spatial resolution, sequence length, bitrate, bit depth, etc.) that may fit validation environments without coverage loss. Chroma sub-sampling also may be a preferred feature (e.g., 4:0:0, 4:2:0, 4:2:2, 4:4:4, etc.) because features such as motion vector reconstruction may be based on luma and therefore may be agnostic to chroma sub-sampling. Another preferred feature may be picture types. High-level syntax (HLS) feature, which define and control the system and transport interface to transmit compressed video, may need to be tested with many different picture types. However, many features that that are used to perform pixel-level decoding may be agnostic to the picture types, and may need to be tested using a limited set of picture types.

In one or more embodiments, a validation environment may provide a software simulation, whereas an emulation environment may provide a hardware simulation (e.g., using an FPGA). In addition to features in a bitstream (e.g., decoder features), there may be other features of validation tests that may be of interest and that may be preferred. For example, a test for a number of frames (e.g., ten or some other number) of a bitstream may be for high resolution (e.g., 1080p, 4K, 8K, etc.), and a test for a number of frames (e.g., 15-20, or some other number) of a bitstream may be for lower resolution. In some validation environments, the higher-resolution test may be preferable, and in other validation environments, the lower-resolution test may be preferable.

In one or more embodiments, the system may select, from among available validation tests, the tests that maximize the validation testing coverage for a video codec while minimizing the number of coverage points. The system may select tests in addition to the minimum selected tests when certain conditions are satisfied. For example, when a resolution of video frames of a bitstream being tested is below a threshold resolution, the system may select the minimum tests for maximum coverage, and may select additional tests. In another example, when the system is post-silicon (e.g., after software validation has executed), the system may select a test for a higher resolution over a test for a lower resolution because the test for the higher resolution may include preferred features. In another example, in the early stages of validation (e.g., the initial generation of RTL code), the system may select validation tests for lower resolutions, and in the later stages of validation (e.g., when more features have been added to the initial generation of the RTL code), the system may select validation tests to cover all features, even at higher resolutions. For example, the initial generation of the codec code may lack monochrome support, but a later generation of the codec code may add monochrome support. When the monochrome support is added to the RTL code, for example, validation on the RTL code may include execution of the validation tests for all of the unique features of the RTL code, resulting in significant execution time and other resources even when a single feature is added to the codec code. The time and computer resources may be reduced by using the enhanced validation techniques described herein to maximize coverage of validation tests while avoiding testing redundancies.

In one or more embodiments, the enhanced validation herein may be applied to validation of a codec that may be implemented in hardware, software, or hybrid media (e.g., a combination of software and hardware). For example, a codec implemented in software may use C or C++ code, and a codec in hardware may be implemented in RTL, and the RTL may have a corresponding behavioral model (e.g., a model in a higher-level language, such as C, that is equivalent in function to the RTL code). In other embodiments, a high-level synthesis (e.g., between hardware and software) may be implemented (e.g., C code converted to RTL). Any validation method may have a coverage report, so a validation method using C may have a coverage report, a validation method using RTL may have a coverage report, and so on. The coverage report may indicate how much of the code may be exercised when running validation tests on the code.

In one or more embodiments, the definition and extraction of coverage points from a coverage report may be agnostic to the coverage report, meaning that coverage points/events may be extracted from RTL functional coverage reports, from a high-level synthesis (HLS) model coverage report, from a C/C++ model coverage report, and the like. The system may extract the coverage points to minimize coverage loss, and may select tests with preferred features, such as spatial resolution, bitrate, sequence length, bit depth, etc. For example, when one high-resolution test takes longer than five low-resolution tests for the same features, the system may select the shorter low-resolution tests over the longer high-resolution test. Some coverage loss may be tolerated based on time thresholds, resolution thresholds, and the like.

In one or more embodiments, the tests selected by the system for maximum validation coverage may include tests that cover unique coverage points (e.g., a test that is the only test to cover a particular feature may be considered unique). For example, when there are five validation tests, and two of the validation tests cover the same coverage point, the system may select one of them for execution, and not the other. When another coverage point is covered uniquely by another one of the five validation tests, the system may select that validation test for execution. When the remaining two validation tests each cover unique coverage points, the two validation tests may be unique, and the system may select one or both of the two validation tests based on whether all unique coverage points are required or some coverage loss is allowed (e.g., a higher-resolution test may be ignored while a lower-resolution test may be selected).

In one or more embodiments, a validation report may list the coverage points of the validation tests for a validation method. For any coverage point, the validation report may indicate whether the coverage point (e.g., feature) was invoked by any test and not invoked by any test. In this manner, when multiple validation tests invoke a same coverage point, the system may select one of the overlapping validation tests for execution (and not the other validation test). Accordingly, the coverage report may be used by the system to identify overlapping and unique validation tests (e.g., in terms of coverage points), and to select the validation tests that may provide the maximum coverage point coverage without executing redundant/overlapping validation tests. For example, the system may execute the validation tests in a C model (e.g., because the C model is faster than an RTL model) before or in parallel with the drafting of the RTL code, so the validation report from the C model may be used to determine which validation tests to execute for the RTL code. The C model validation may be executed in one software application, and the RTL model validation may be executed in another software application.

In one or more embodiments, full simulation tests for validation (e.g., all validation tests) executed in a C-language model (or a model written in a high-level language, such as C, C++, etc. to model functionalities/behaviors of the software unit being validated) may result in generation of coverage reports based on the execution of validation tests in a first application. A second application may process the coverage reports to identify unique and overlapping test coverage, and select a subset of the full simulation test set to execute. An example simulation resulted in a 50-90% test reduction for HEVC code (e.g., HEVC 8-10b 420 decoder and pack (PAK—e.g., quantization, entropy encoding, pixel reconstruction, and motion compensation) without coverage loss.

In one or more embodiments, coverage reports may indicate the number or percentage of functions and conditions covered (e.g., invoked) and uncovered. For example, execution of a validation test suite for software, such as video codec code, may invoke 70% of functions of the code and 60% of conditions in the code. Executing another validation test suit may result in different coverage percentages for functions and/or conditions, even for the same code (e.g., the validation test suites may include different validation tests). In this manner, selecting a subset of tests of a test suite that allow for maximum desired coverage may reduce the number of tests in the test suite that need to be executed.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is an example system 100 for enhanced validation of video codecs, according to some example embodiments of the present disclosure.

Referring to FIG. 1, the system 100 may include a device 102 (e.g., having a display) presenting a first application 104 with which to execute a first computer programming language validation model 106. The first computer programming language validation model 106 may represent validation tests executed on computer code 108 (e.g., video codec code or other computer code). The computer code 108 may include conditions/decisions (e.g., if/then, else, etc.) and functions (e.g., a group of statements that perform one or more tasks). Execution of the validation tests of the first computer programming language validation model 106 may cause the first application 104 to generate a coverage report 120, which may indicate which functions 122 and/or conditions 124 are covered by the validation tests of the first computer programming language validation model 106 (e.g., validation test coverage 130). For example, as shown, the validation tests of the first computer programming language validation model 106 may include validation tests A, B, . . . , J, where J may be any number of validation tests. A value of 1 for any validation test may indicate that the corresponding functions 122 and/or conditions 124 were invoked by the validation test using the first computer programming language validation model 106. A value of 0 for any validation test may indicate that the corresponding functions 122 and/or conditions 124 were not invoked by the validation test using the first computer programming language validation model 106. For example, as shown, for function/condition 1 (e.g., of the computer code 108 validated by the validation tests of the first computer programming language validation model 106), A: 1 of the validation test coverage 130 may indicate that validation test A invoked function/condition 1, B: 1 may indicate that validation test B invoked function/condition 1, and J: 0 may indicate that validation test J did not invoke function/condition 1. For the other examples shown in FIG. 1, function/condition 2 of the computer code 108 validated by the first computer programming language validation model 106 may be invoked by validation test A, but not by test B or test J. Function/condition N of the computer code 108 validated by the first computer programming language validation model 106 may be invoked by validation test J, but not by test A or test B. In this manner, validation test A and validation test B overlap in that they both invoked function/condition 1. Validation test J may be the only validation test that invoked function/condition N.

Still referring to FIG. 1, the coverage report 120 and its data may be input to a second application 150 (e.g., using a second computer programming language that may be a lower-level language than the first computer programming language of the first computer programming language validation model 106). The second application 150 may generate a validation plan 152 for the second computer programming language code (e.g., video codec code or other computer code). For example, the first computer programming language validation model 106 may represent the computer code 108 in a first language, and the second computer programming language code may represent the computer code 108 in a second computer language (e.g., models of the same video codec code in different computer languages). The validation plan 152 may maximize the validation test coverage 130 by covering all or a subset of the functions 122 and/or conditions 124, but without needing to execute (e.g., include the validation plan 152) all of the validation tests. In the example shown, of validation tests A, B, and J, only validation tests A and J are needed to cover the function/condition 1, the function/condition 2, and the function/condition N, as validation tests A and B overlapped, so only one of them (A) may be selected, and validation test J may be selected because it uniquely invoked the function/condition N. In this manner, the validation plan 152 may select a subset of all the validation tests available from the set of validation tests used in the first computer programming language validation model 106 (e.g., the validation tests indicated in the validation test coverage 130), reducing the total number of validation tests needed to execute to validate the same computer code in the second computer programming language. While the FIG. 1 example shows the validation plan including two of three possible validation tests, implementation may include many possible validation tests, so the subset of validation tests represented by the validation plan 152 may include a significant reduction in the number of validation tests needed for validation of the code in the second computer programming language while avoiding any coverage loss (e.g., when compared to the execution of all the validation tests and their coverage indicated by the validation test coverage 130), or while allowing some coverage loss based on some conditions.

In one or more embodiments, the first computer language for the computer code 108 may be a higher-level computer language (e.g., C, C++, etc.) in order to determine which validation tests to be executed for the corresponding computer code written in a lower-level language used as the second computer language for which the validation plan 152 is generated (e.g. RTL—register transfer language). The second application 150 may extract a minimum set of coverage points from the coverage report 120. Not every coverage point may be included in every coverage report, and some coverage reports may have the same coverage points as one another. The coverage report 120 may indicate which coverage points are covered by respective validation tests (e.g., the validation test coverage 130). The minimum set of coverage points may require that all the functions 122 and/or conditions 124 of the computer code 108 be tested, or may define a preferred set of features that may be a subset of all features of the computer code 108 (e.g., some coverage loss for certain features may be tolerated). The second application 150 may select for execution the validation tests that validate the minimum set of coverage points from the computer code 108 to provide the maximum desired coverage for the computer code 108. When validation tests overlap in coverage (e.g., test the same function and/or decision of the video codec code), the second application 150 may select one of the overlapping validation tests over any others that overlap in coverage. The selection may be arbitrary and/or based on other factors, such as how many features are covered by the validation test.

In one or more embodiments, the second application 150 may reduce the number of validation tests without coverage loss, and may identify validation tests with preferred features (e.g., spatial resolution, sequence length, bitrate, bit depth, etc.) that may fit validation environments without coverage loss. For example, a validation environment may provide a software simulation, whereas an emulation environment may provide a hardware simulation (e.g., using an FPGA). In addition to features in a bitstream (e.g., decoder features), there may be other features of validation tests that may be of interest and that may be preferred. For example, a test for a number of frames (e.g., ten or some other number) of a bitstream may be for high resolution (e.g., 1080p, 4K, 8K, etc.), and a test for a number of frames (e.g., 15-20, or some other number) of a bitstream may be for lower resolution. In some validation environments, the higher-resolution test may be preferable, and in other validation environments, the lower-resolution test may be preferable.

In one or more embodiments, the second application 150 may select, from among available validation tests of the first computer programming language validation model 106, the tests that maximize the validation testing coverage for the computer code 108 while minimizing the number of coverage points. The second application 150 may select tests in addition to the minimum selected tests when certain conditions are satisfied. For example, when a resolution of video frames of a bitstream being tested is below a threshold resolution, the second application 150 may select the minimum tests for maximum coverage, and may select additional tests. In another example, when the second application 150 is post-silicon (e.g., after software validation has executed), the second application 150 may select a test for a higher resolution over a test for a lower resolution because the test for the higher resolution may include preferred features. In another example, in the early stages of validation (e.g., the initial generation of RTL code), the second application 150 may select validation tests for lower resolutions, and in the later stages of validation (e.g., when more features have been added to the initial generation of the RTL code), the second application 150 may select validation tests to cover all features, even at higher resolutions. For example, the initial generation of the codec code may lack monochrome support, but a later generation of the codec code may add monochrome support. When the monochrome support is added to the RTL code, for example, validation on the RTL code may include execution of the validation tests for all of the unique features of the RTL code, resulting in significant execution time and other resources even when a single feature is added to the codec code. The time and computer resources may be reduced by using the enhanced validation techniques described herein to maximize coverage of validation tests while avoiding testing redundancies.

In one or more embodiments, the definition and extraction of coverage points from a coverage report may be agnostic to the coverage report 120, meaning that coverage points/events may be extracted from RTL functional coverage reports, from a high-level synthesis (HLS) model coverage report, from a C/C++ model coverage report, and the like. The second application 150 may extract the coverage points to minimize coverage loss, and may select tests with preferred features, such as spatial resolution, bitrate, sequence length, bit depth, etc. For example, when one high-resolution test takes longer than five low-resolution tests for the same features, the second application 150 may select the shorter low-resolution tests over the longer high-resolution test. Some coverage loss may be tolerated based on time thresholds, resolution thresholds, and the like.

In one or more embodiments, the tests selected by the second application 150 for maximum validation coverage may include tests that cover unique coverage points (e.g., a test that is the only test to cover a particular feature may be considered unique). For example, when there are five validation tests, and two of the validation tests cover the same coverage point, the second application 150 may select one of them for execution, and not the other. When another coverage point is covered uniquely by another one of the five validation tests, the second application 150 may select that validation test for execution. When the remaining two validation tests each cover unique coverage points, the two validation tests may be unique, and the second application 150 may select one or both of the two validation tests based on whether all unique coverage points are required or some coverage loss is allowed (e.g., a higher-resolution test may be ignored while a lower-resolution test may be selected).

In one or more embodiments, a validation report may list the coverage points of the validation tests for a validation method. For any coverage point, the validation report may indicate whether the coverage point (e.g., feature) was invoked by any test and not invoked by any test. In this manner, when multiple validation tests invoke a same coverage point, the second application 150 may select one of the overlapping validation tests for execution (and not the other validation test). Accordingly, the coverage report 120 may be used by the second application 150 to identify overlapping and unique validation tests (e.g., in terms of coverage points), and to select the validation tests that may provide the maximum coverage point coverage without executing redundant/overlapping validation tests. For example, the second application 150 may execute the validation tests in a C model (e.g., because the C model is faster than an RTL model) before or in parallel with the drafting of the RTL code, so the coverage report 120 from the C model (e.g., the first computer programming language validation model 106) may be used to determine which validation tests to execute for the RTL code. The C model validation may be executed in one software application (e.g., the first application 104), and the RTL model validation may be executed in another software application (e.g., the second application 150).

Figure 2:
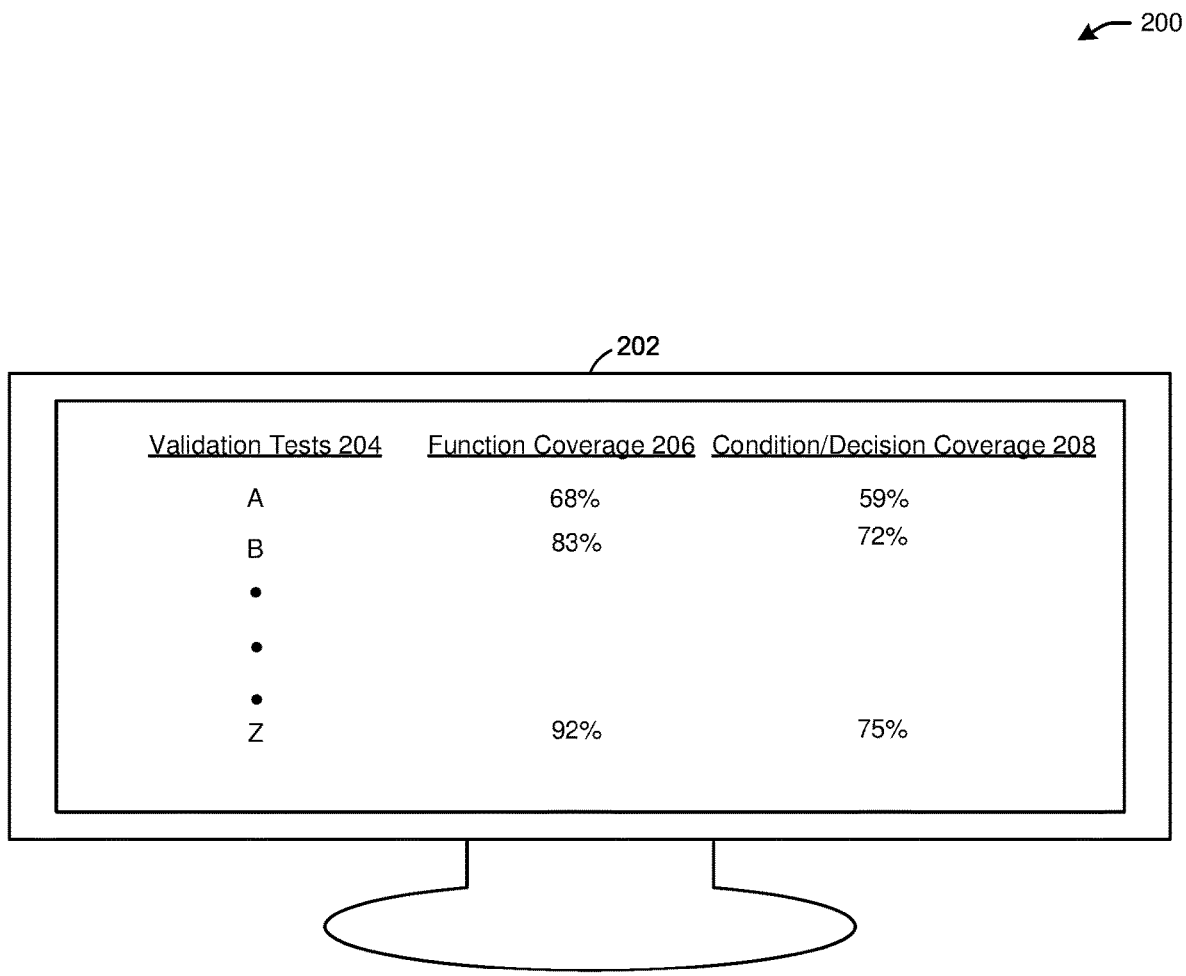
FIG. 2 is an example presentation of validation coverage for enhanced validation of video codecs, according to some example embodiments of the present disclosure.

FIG. 2 is an example presentation 200 of validation coverage for enhanced validation of video codecs, according to some example embodiments of the present disclosure.

Referring to FIG. 2, the presentation 200 may include a device 202 (e.g., similar to the device 102 of FIG. 1) for presenting validation coverage (e.g., the validation test coverage 130 of FIG. 1). The validation coverage may refer to the functions, conditions, and/or decisions invoked by respective validation tests 204 of a validation plan (e.g., the validation tests of the first computer programming language validation model 106 of FIG. 1). Any validation test executed from the validation tests 204 may invoke some, but not necessarily all, of the functions, conditions, and/or decisions of the code (e.g., the computer code 108 of FIG. 1) validated by the validation tests. For example, 100% coverage would indicate that all functions, conditions, and/or decisions are invoked by a particular validation test. As shown in FIG. 2, function coverage 206 may indicate a percentage of functions of the code (e.g., the computer code 108) invoked by respective validation tests (e.g., validation test A, validation test B, . . . , validation test Z), represented by function coverage 206, and a percentage of conditions and/or decisions of the code (e.g., the computer code 108) invoked by respective validation tests (e.g., validation test A, validation test B, . . . , validation test Z), represented by function coverage 208.

Figure 3:
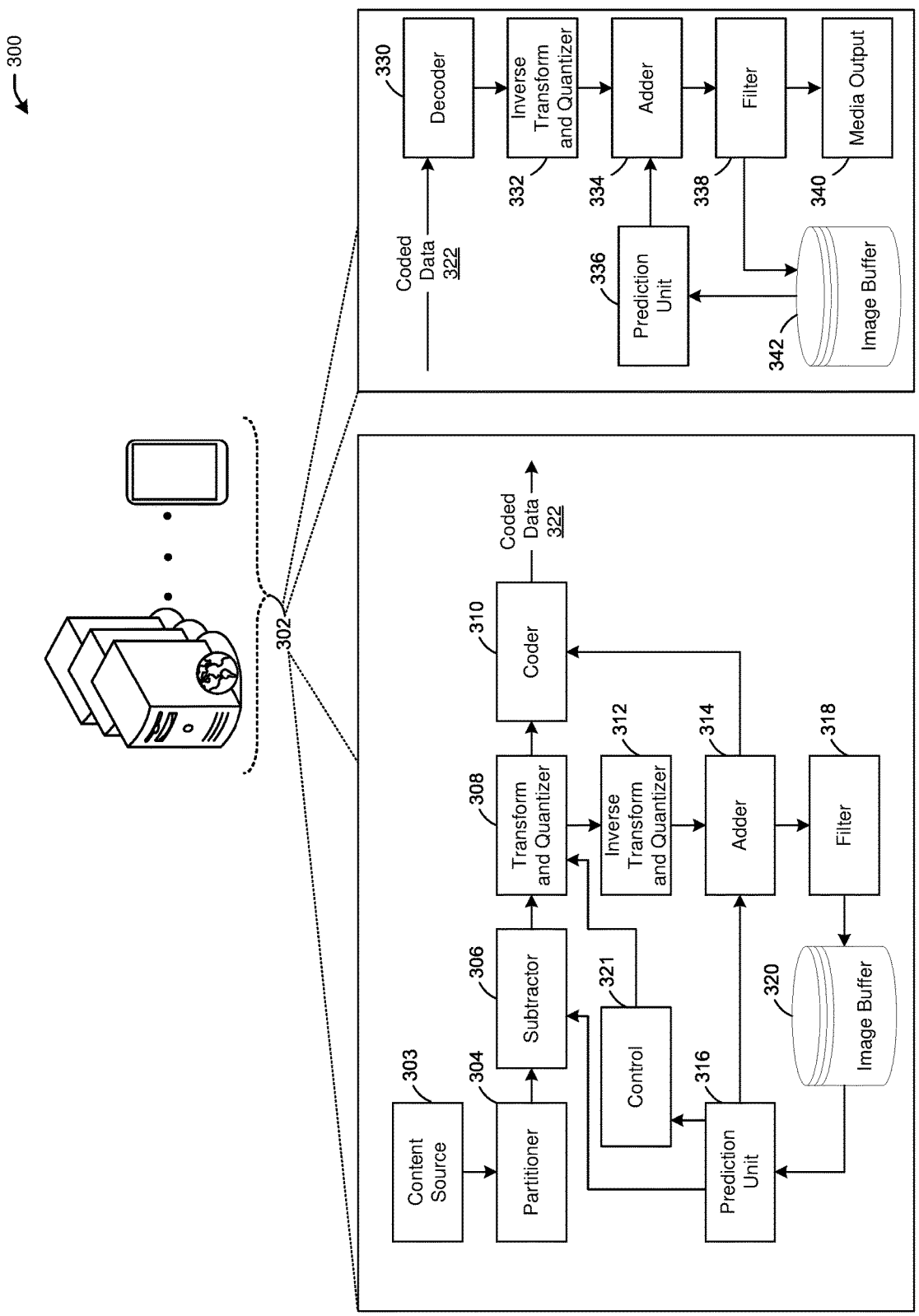
FIG. 3 is an example system illustrating components of encoding and decoding devices, according to some example embodiments of the present disclosure.

FIG. 3 is an example system 300 illustrating components of encoding and decoding devices, according to some example embodiments of the present disclosure.

Referring to FIG. 3, the system 300 may include devices 302 having encoder and/or decoder components. As shown, the devices 302 may include a content source 303 that provides video and/or audio content (e.g., a camera or other image capture device, stored images/video, etc.). The content source 303 may provide media (e.g., video and/or audio) to a partitioner 304, which may prepare frames of the content for encoding. A subtractor 306 may generate a residual as explained further herein. A transform and quantizer 308 may generate and quantize transform units to facilitate encoding by a coder 310 (e.g., entropy coder). Transform and quantized data may be inversely transformed and inversely quantized by an inverse transform and quantizer 312. An adder 314 may compare the inversely transformed and inversely quantized data to a prediction block generated by a prediction unit 316, resulting in reconstructed frames. A filter 318 (e.g., in-loop filter for resizing/cropping, color conversion, de-interlacing, composition/blending, etc.) may revise the reconstructed frames from the adder 314, and may store the reconstructed frames in an image buffer 320 for use by the prediction unit 316. A control 321 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 316. Using the encoding aspects, the transform and quantizer 308 may generate and quantize transform units to facilitate encoding by the coder 310, which may generate coded data 322 that may be transmitted (e.g., an encoded bitstream).

Still referring to FIG. 3, the devices 302 may receive coded data (e.g., the coded data 322) in a bitstream, and a decoder 330 may decode the coded data, extracting quantized residual coefficients and context data. An inverse transform and quantizer 332 may reconstruct pixel data based on the quantized residual coefficients and context data. An adder 334 may add the residual pixel data to a predicted block generated by a prediction unit 336. A filter 338 may filter the resulting data from the adder 334. The filtered data may be output by a media output 340, and also may be stored as reconstructed frames in an image buffer 342 for use by the prediction unit 336.

Referring to FIG. 3, the system 300 performs the methods of intra prediction disclosed herein, and is arranged to perform at least one or more of the implementations described herein including intra block copying. In various implementations, the system 300 may be configured to undertake video coding and/or implement video codecs according to one or more standards. Further, in various forms, video coding system 300 may be implemented as part of an image processor, video processor, and/or media processor and undertakes inter-prediction, intra-prediction, predictive coding, and residual prediction. In various implementations, system 300 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 300 may be an encoder where current video information in the form of data related to a sequence of video frames may be received to be compressed. By one form, a video sequence (e.g., from the content source 303) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 304 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 300 may receive an input frame from the content source 303. The input frames may be frames sufficiently pre-processed for encoding.

The system 300 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 312 to generate the same reference or reconstructed blocks, frames, or other units as would be generated at a decoder such as decoder 330. Thus, the prediction unit 316 may use the inverse transform and quantizer 312, adder 314, and filter 318 to reconstruct the frames.

The prediction unit 316 may perform inter-prediction including motion estimation and motion compensation, intra-prediction according to the description herein, and/or a combined inter-intra prediction. The prediction unit 316 may select the best prediction mode (including intra-modes) for a particular block, typically based on bit-cost and other factors. The prediction unit 316 may select an intra-prediction and/or inter-prediction mode when multiple such modes of each may be available. The prediction output of the prediction unit 316 in the form of a prediction block may be provided both to the subtractor 306 to generate a residual, and in the decoding loop to the adder 314 to add the prediction to the reconstructed residual from the inverse transform to reconstruct a frame.

The partitioner 304 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 316 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 316 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 316 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 306 from the current block of original image data, and the resulting residual may be partitioned into one or more transform blocks (TUs) so that the transform and quantizer 308 can transform the divided residual data into transform coefficients using discrete cosine transform (DCT) for example. Using the quantization parameter (QP) set by the system 300, the transform and quantizer 308 then uses lossy resampling or quantization on the coefficients. The frames and residuals along with supporting or context data block size and intra displacement vectors and so forth may be entropy encoded by the coder 310 and transmitted to decoders.

In one or more embodiments, a system 300 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 300 may process the bitstream with an entropy decoder 330 to extract the quantized residual coefficients as well as the context data. The system 300 then may use the inverse transform and quantizer 332 to reconstruct the residual pixel data.

The system 300 then may use an adder 334 (along with assemblers not shown) to add the residual to a predicted block. The system 300 also may decode the resulting data using a decoding technique employed depending on the coding mode indicated in syntax of the bitstream, and either a first path including a prediction unit 336 or a second path that includes a filter 338. The prediction unit 336 performs intra-prediction by using reference block sizes and the intra displacement or motion vectors extracted from the bitstream, and previously established at the encoder. The prediction unit 336 may utilize reconstructed frames as well as inter-prediction motion vectors from the bitstream to reconstruct a predicted block. The prediction unit 336 may set the correct prediction mode for each block, where the prediction mode may be extracted and decompressed from the compressed bitstream.

In one or more embodiments, the coded data 322 may include both video and audio data. In this manner, the system 300 may encode and decode both audio and video.

In one or more embodiments, the video codecs (e.g., the computer code 108 of FIG. 1) used by the system 300 may be validated by the system 100 of FIG. 1, and the validation tests used for one computer programming language (e.g., an RTL model for the computer code) may be validated using a subset of validation tests executed by a higher-level computer programming language (e.g., a C/C++ model for the computer code). In this manner, the enhanced validation described herein may apply to the computer programming code that facilitates the video coding/decoding functions described with respect to FIG. 3.

It is understood that the above descriptions are for purposes of illustration and are not meant to be limiting.

Figure 4:
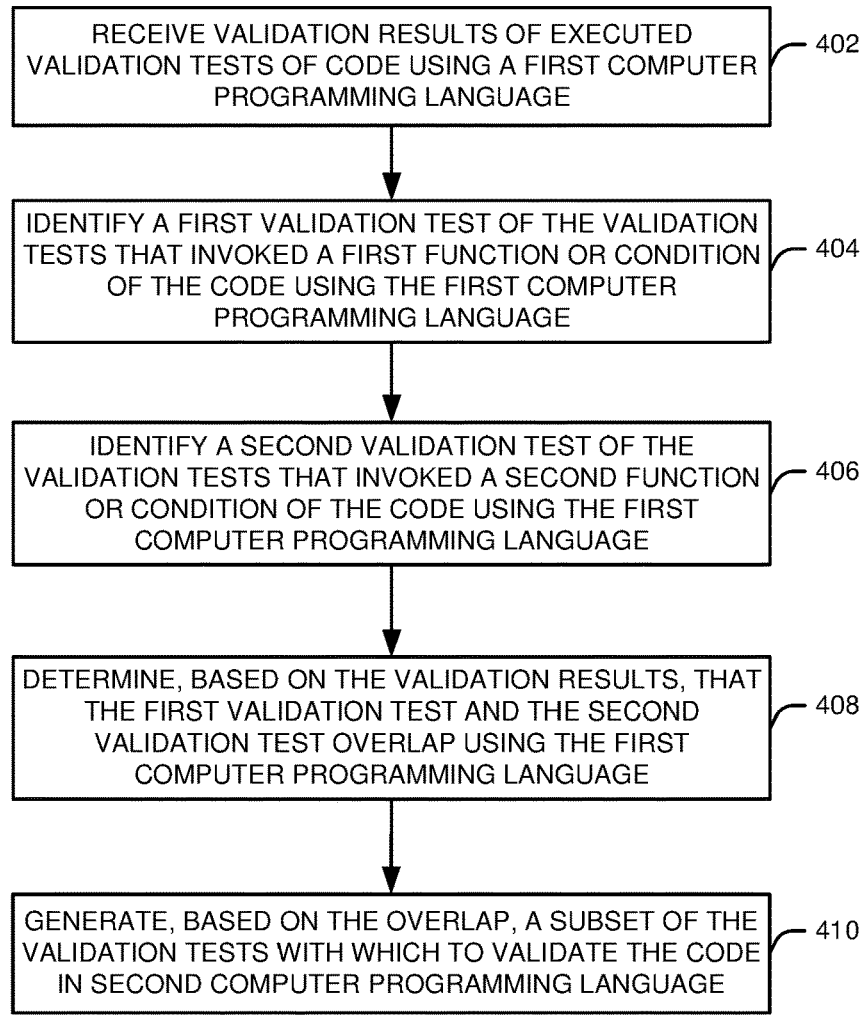
FIG. 4 illustrates a flow diagram of an illustrative process for enhanced validation of video codecs, in accordance with one or more example embodiments of the present disclosure.

FIG. 4 illustrates a flow diagram of illustrative process 400 for enhanced validation of video codecs, in accordance with one or more example embodiments of the present disclosure.

At block 402, a device (e.g., the device 102 of FIG. 1, the device 202 of FIG. 2, the device 302 of FIG. 3) may receive validation results (e.g., the coverage report 120 of FIG. 1) of executed validation tests for validating code of a video codec using a first computer programming language (e.g., the first computer programming language validation model 106 of FIG. 1), the validation results indicative of invocations (e.g., the validation test coverage 130 of FIG. 1) of functions and conditions (e.g., the functions 122 and/or conditions 124 of FIG. 1) of the code during the executed validation tests.

At block 404, the device may identify, from the validation results, a first validation test that, during the executed validation tests, invoked a first function or condition of the code using the first computer programming language.

At block 406, the device may identify, from the validation results, a second validation test that, during the executed validation tests, invoked the first function or condition of the code using the first computer programming language.

At block 408, the device may determine, from the validation results, that the first validation test and the second validation test overlap in invoking the first function or condition of the code using the first computer programming language (e.g., validation test A and validation test B of FIG. 1 both covering the function/condition 1 of FIG. 1).

At block 410, the device may generate, based on the determination that the first validation test and the second validation test overlap, a first subset of the validation tests with which to validate code of the video codec using a second computer programming language, wherein the first subset of the validation tests excludes a second subset of the validation tests that invokes overlapping functions and conditions of the code.

It is understood that the above descriptions are for purposes of illustration and are not meant to be limiting.

Figure 5:
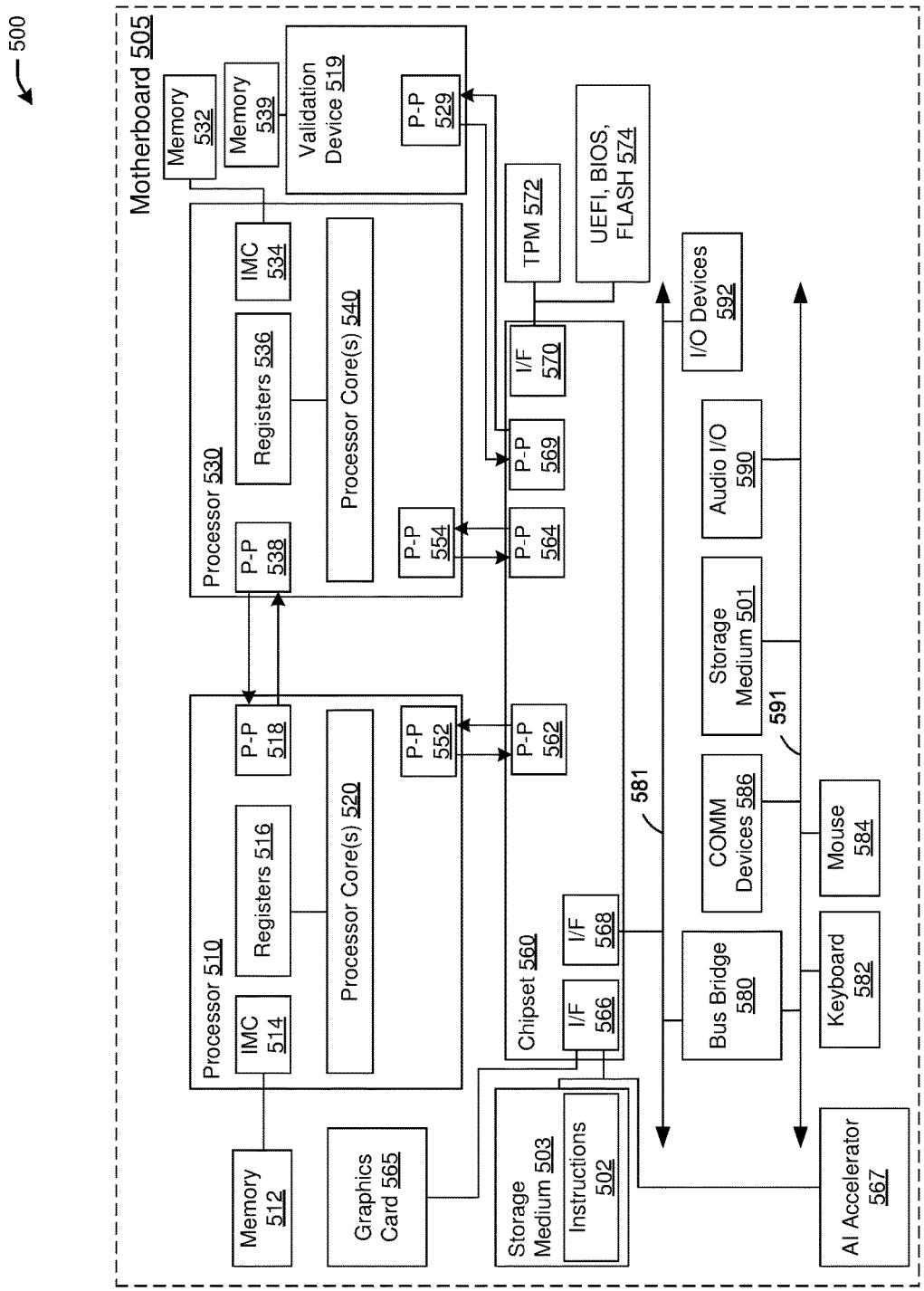
FIG. 5 illustrates an embodiment of an exemplary system, in accordance with one or more example embodiments of the present disclosure.

FIG. 5 illustrates an embodiment of an exemplary system 500, in accordance with one or more example embodiments of the present disclosure.

In various embodiments, the computing system 500 may comprise or be implemented as part of an electronic device.

In some embodiments, the computing system 500 may be representative, for example, of a computer system that implements one or more components of FIG. 1.

The embodiments are not limited in this context. More generally, the computing system 500 is configured to implement all logic, systems, processes, logic flows, methods, equations, apparatuses, and functionality described herein and with reference to FIGS. 1-4.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point interconnect platform that includes a processor 510, a processor 530 coupled via a point-to-point interconnects as an Ultra Path Interconnect (UPI), and a validation device 519 (e.g., capable of performing the functions of FIGS. 1, 2, and 4). In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514 and point-to-point (P-P) interfaces 518 and 552. Similarly, the processor 530 includes an IMC 534 and P-P interfaces 538 and 554. The IMC's 514 and 534 couple the processors 510 and 530, respectively, to respective memories, a memory 512 and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a validation device 519. The validation device 519 may be connected to chipset 560 by means of P-P interfaces 529 and 569. The validation device 519 may also be connected to a memory 539. In some embodiments, the validation device 519 may be connected to at least one of the processors 510 and 530. In other embodiments, the memories 512, 532, and 539 may couple with the processor 510 and 530, and the validation device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the validation device 519 may access the storage medium 503 through chipset 560.

Storage medium 503 may comprise any non-transitory computer-readable storage medium or machine-readable storage medium, such as an optical, magnetic or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interfaces 552 and 562 and the processor 530 couples to a chipset 560 via P-P interfaces 554 and 564. Direct Media Interfaces (DMIs) may couple the P-P interfaces 552 and 562 and the P-P interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 which couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 503 and chipset 560. The AI accelerator 567 may deliver the processing power and energy efficiency needed to enable abundant-data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Example 1 may be a device comprising storage coupled to processing circuitry, the processing circuitry configured to: receive validation results of executed validation tests for validating code of a video codec using a first computer programming language, the validation results indicative of invocations of functions and conditions of the code during the executed validation tests; identify, from the validation results, a first validation test that, during the executed validation tests, invoked a first function or condition of the code using the first computer programming language; identify, from the validation results, a second validation test that, during the executed validation tests, invoked the first function or condition of the code using the first computer programming language; determine, from the validation results, that the first validation test and the second validation test overlap in invoking the first function or condition of the code using the first computer programming language; and generate, based on the determination that the first validation test and the second validation test overlap, a first subset of the validation tests with which to validate code of the video codec using a second computer programming language, wherein the first subset of the validation tests excludes a second subset of the validation tests that invokes overlapping functions and conditions of the code.

Example 2 may include the device of example 1 and/or some other example herein, wherein the first computer programming language is C or C++, and wherein the second computer programming language is register transfer language (RTL).

Example 3 may include the device of example 1 and/or some other example herein, wherein the first computer programming language is high-level synthesis (HLS), and wherein the second computer programming language is RTL.

Example 4 may include the device of example 1 and/or some other example herein, wherein the executed validation tests are executed using a first software application, and wherein the first subset of the validation tests are executed using a second software application.

Example 5 may include the device of example 1 and/or some other example herein, wherein the validations tests comprise a third subset of the validation tests, wherein each validation test of the third subset of the validation tests invokes a unique function or condition of the code during the executed validation tests, and wherein the first subset is smaller than the third subset.

Example 6 may include the device of example 5 and/or some other example herein, wherein the processing circuitry is further configured to: identify preferred functions and conditions of the code to invoke, wherein the first subset comprises the preferred functions and conditions, and wherein the third subset comprises functions and conditions in addition to the preferred subset and conditions.

Example 7 may include the device of example 6 and/or some other example herein, wherein to identify the preferred functions and conditions of the code to invoke comprises to identify a preferred spatial resolution associated with a bitstream using the video codec, and wherein the validation results are associated with validating the code of the video codec based on the bitstream.

Example 8 may include the device of example 6 and/or some other example herein, wherein to identify the preferred functions and conditions of the code to invoke comprises to identify a preferred sequence length associated with a bitstream using the video codec, and wherein the validation results are associated with validating the code of the video codec based on the bitstream.

Example 9 may include the device of example 6 and/or some other example herein, wherein to identify the preferred functions and conditions of the code to invoke comprises to identify a preferred bitrate associated with a bitstream using the video codec, and wherein the validation results are associated with validating the code of the video codec based on the bitstream.

Example 10 may include the device of example 6 and/or some other example herein, wherein to identify the preferred functions and conditions of the code to invoke comprises to identify a preferred bit depth and at least one additional preferred coding feature associated with a bitstream using the video codec, and wherein the validation results are associated with validating the code of the video codec based on the bitstream.

Example 11 may include a computer-readable storage medium comprising instructions to cause processing circuitry of a device, upon execution of the instructions by the processing circuitry, to: receive validation results of executed validation tests for validating code of a video codec using a first computer programming language, the validation results indicative of invocations of functions and conditions of the code during the executed validation tests; identify, from the validation results, a first validation test that, during the executed validation tests, invoked a first function or condition of the code using the first computer programming language; identify, from the validation results, a second validation test that, during the executed validation tests, invoked the first function or condition of the code using the first computer programming language; determine, from the validation results, that the first validation test and the second validation test overlap in invoking the first function or condition of the code using the first computer programming language; and generate, based on the determination that the first validation test and the second validation test overlap, a first subset of the validation tests with which to validate code of the video codec using a second computer programming language, wherein the first subset of the validation tests excludes a second subset of the validation tests that invokes overlapping functions and conditions of the code.

Example 12 may include the computer-readable medium of example 11 and/or some other example herein, wherein the first computer programming language is C or C++, and wherein the second computer programming language is register transfer language (RTL).

Example 13 may include the computer-readable medium of example 11 and/or some other example herein, wherein the first computer programming language is high-level synthesis (HLS), and wherein the second computer programming language is RTL.

Example 14 may include the computer-readable medium of example 11 and/or some other example herein, wherein the executed validation tests are executed using a first software application, and wherein the first subset of the validation tests are executed using a second software application.

Example 15 may include the computer-readable medium of example 11 and/or some other example herein, wherein the validations tests comprise a third subset of the validation tests, wherein each validation test of the third subset of the validation tests invokes a unique function or condition of the code during the executed validation tests, and wherein the first subset is smaller than the third subset.

Example 16 may include the computer-readable medium of example 15 and/or some other example herein, wherein execution of the instructions further causes the processing circuitry to: identify preferred functions and conditions of the code to invoke, wherein the first subset comprises the preferred functions and conditions, and wherein the third subset comprises functions and conditions in addition to the preferred subset and conditions.

Example 17 may include the computer-readable medium of example 16 and/or some other example herein, wherein to identify the preferred functions and conditions of the code to invoke comprises to identify at least one of a preferred spatial resolution, a preferred sequence length, or a preferred bitrate associated with a bitstream using the video codec, and wherein the validation results are associated with validating the code of the video codec based on the bitstream.

Example 18 may include a method for validating computer programming code, the method comprising: receiving, by processing circuitry of a device, validation results of executed validation tests for validating code of a video codec using a first computer programming language, the validation results indicative of invocations of functions and conditions of the code during the executed validation tests; identifying, by the processing circuitry, from the validation results, a first validation test that, during the executed validation tests, invoked a first function or condition of the code using the first computer programming language; identifying, by the processing circuitry, from the validation results, a second validation test that, during the executed validation tests, invoked the first function or condition of the code using the first computer programming language; determining, by the processing circuitry, from the validation results, that the first validation test and the second validation test overlap in invoking the first function or condition of the code using the first computer programming language; and generating, by the processing circuitry, based on the determination that the first validation test and the second validation test overlap, a first subset of the validation tests with which to validate code of the video codec using a second computer programming language, wherein the first subset of the validation tests excludes a second subset of the validation tests that invokes overlapping functions and conditions of the code.

Example 19 may include the method of example 18 and/or some other example herein, wherein the validations tests comprise a third subset of the validation tests, wherein each validation test of the third subset of the validation tests invokes a unique function or condition of the code during the executed validation tests, and wherein the first subset is smaller than the third subset.

Example 20 may include the method of example 19 and/or some other example herein, further comprising: identifying preferred functions and conditions of the code to invoke, wherein the first subset comprises the preferred functions and conditions, and wherein the third subset comprises functions and conditions in addition to the preferred subset and conditions.

Example 21 may include an apparatus comprising means for: receiving validation results of executed validation tests for validating code of a video codec using a first computer programming language, the validation results indicative of invocations of functions and conditions of the code during the executed validation tests; identifying, from the validation results, a first validation test that, during the executed validation tests, invoked a first function or condition of the code using the first computer programming language; identifying, from the validation results, a second validation test that, during the executed validation tests, invoked the first function or condition of the code using the first computer programming language; determining, from the validation results, that the first validation test and the second validation test overlap in invoking the first function or condition of the code using the first computer programming language; and generating, based on the determination that the first validation test and the second validation test overlap, a first subset of the validation tests with which to validate code of the video codec using a second computer programming language, wherein the first subset of the validation tests excludes a second subset of the validation tests that invokes overlapping functions and conditions of the code.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
    interface circuitry;
    machine-readable instructions; and
    at least one programmable circuit to be programmed based on the machine-readable instructions to:
        execute a set of validation tests with a first implementation of a video codec based on a first computer programming language to generate validation results, wherein the validation results identify invocations of at least one of functions or conditions of the video codec during execution of the set of validation tests;
        identify, from the validation results, a first validation test of the set of validation tests that invoked a first one of the functions or conditions of the video codec during the execution of the set of validation tests;
        identify, from the validation results, a second validation test of the set of validation tests that invoked the first one of the functions or conditions of the video codec during the execution of the set of validation tests; and
        execute, based on a determination that the first validation test and the second validation test of the set of validation tests both invoke the first one of the functions or conditions of the video codec during the execution of the set of validation tests, a first subset of the set of validation tests with a second implementation of the video codec based on a second computer programming language, wherein the first subset of the set of validation tests includes fewer validation tests than the set of validation tests, and the first subset of the set of validation tests excludes a second subset of the set of validation tests that invokes at least one of overlapping functions or conditions of the video codec relative to the first subset of the set of validation tests.

2. The device of claim 1, wherein the first computer programming language is C or C++, and the second computer programming language is register transfer language.

3. The device of claim 1, wherein the first computer programming language is high-level synthesis, and the second computer programming language is register transfer language.

4. The device of claim 1, wherein one or more of the at least one programmable circuit is to:
execute the set of validation tests with a first software application; and
execute the first subset of the set of validation tests with a second software application.

5. The device of claim 1, wherein the set of validation tests includes a third subset of the set of validation tests, one or more validation tests of the third subset of the set of validation tests invoke at least one of a unique function or condition of the video codec, and the first subset of the set of validation tests is smaller than the third subset of the set of validation tests.

6. The device of claim 5, wherein one or more of the at least one programmable circuit is to:
identify a preferred function or condition of the video codec to invoke, wherein the first subset of the set of validation tests includes the preferred function or condition of the video codec, and the third subset of the set of validation tests includes at least one other function or condition of the video codec in addition to the preferred function or condition of the video codec.

7. The device of claim 6, wherein the preferred function or condition of the video codec includes a preferred spatial resolution associated with a bitstream produced by the video codec, and the validation results are based on the bitstream.

8. The device of claim 6, wherein the preferred function or condition of the video codec includes a preferred sequence length associated with a bitstream produced by the video codec, and the validation results are based on the bitstream.

9. The device of claim 6, wherein the preferred function or condition of the video codec includes a preferred bitrate associated with a bitstream produced by the video codec, and the validation results are based on the bitstream.

10. The device of claim 6, wherein the preferred function or condition of the video codec includes a preferred bit depth and at least one additional preferred coding feature associated with a bitstream produced by the video codec, and the validation results are based on the bitstream.

11. A non-transitory computer-readable storage medium comprising instructions to cause at least one programmable circuit of a device to at least:
execute a set of validation tests with a first implementation of a video codec based on a first computer programming language to generate validation results, wherein the validation results identify invocations of at least one of functions or conditions of the video codec during execution of the set of validation tests;
identify, from the validation results, a first validation test of the set of validation tests that invoked a first one of the functions or conditions of the video codec during the execution of the set of validation tests;
identify, from the validation results, a second validation test of the set of validation tests that invoked the first one of the functions or conditions of the video codec during the execution of the set of validation tests; and
execute, based on a determination that the first validation test and the second validation test of the set of validation tests both invoke the first one of the functions or conditions of the video codec during the execution of the set of validation tests, a first subset of the set of validation tests with a second implementation of the video codec based on a second computer programming language, wherein the first subset of the set of validation tests includes fewer validation tests than the set of validation tests, and the first subset of the set of validation tests excludes a second subset of the set of validation tests that invokes at least one of overlapping functions or conditions of the video codec relative to the first subset of the set of validation tests.

12. The non-transitory computer-readable storage medium of claim 11, wherein the first computer programming language is C or C++, and the second computer programming language is register transfer language.

13. The non-transitory computer-readable storage medium of claim 11, wherein the first computer programming language is high-level synthesis, and the second computer programming language is register transfer language.

14. The non-transitory computer-readable storage medium of claim 11, wherein the instructions are to cause one or more of the at least one programmable circuit to:
execute the set of validation tests with a first software application; and
execute the first subset of the set of validation tests with a second software application.

15. The non-transitory computer-readable storage medium of claim 11, wherein the set of validation tests includes a third subset of the set of validation tests, one or more validation tests of the third subset of the set of validation tests invoke at least one of a unique function or condition of the video codec, and the first subset of the set of validation tests is smaller than the third subset of the set of validation tests.

16. The non-transitory computer-readable storage medium of claim 15, wherein the instructions are to cause one or more of the at least one programmable circuit to:
identify a preferred function or condition of the video codec to invoke, wherein the first subset of the set of validation tests includes the preferred function or condition of the video codec, and the third subset of the set of validation tests includes at least one other function or condition of the video codec in addition to the preferred function or condition of the video codec.

17. The non-transitory computer-readable storage medium of claim 16, wherein the preferred function or condition of the video codec includes at least one of a preferred spatial resolution, a preferred sequence length, or a preferred bitrate associated with a bitstream produced by the video codec, and the validation results are based on the bitstream.

18. A method comprising:
executing, by processing circuitry of a device, a set of validation tests with a first implementation of a video codec based on a first computer programming language to generate validation results, wherein the validation results identify invocations of at least one of functions or conditions of the video codec during execution of the set of validation tests;

identifying, by the processing circuitry of the device, from the validation results, a first validation test of the set of validation tests that invoked a first one of the functions or conditions of the video codec during the execution of the set of validation tests;

identifying, by the processing circuitry of the device, from the validation results, a second validation test of the set of validation tests that invoked the first one of the functions or conditions of the video codec during the execution of the set of validation tests; and executing, by the processing circuitry of the device, based on a determination that the first validation test and the second validation test of the set of validation tests both invoke the first one of the functions or conditions of the video codec during the execution of the set of validation tests, a first subset of the set of validation tests with a second implementation of the video codec based on a second computer programming language, wherein the first subset of the set of validation tests includes fewer validation tests than the set of validation tests, and the first subset of the set of validation tests excludes a second subset of the set of validation tests that invokes at least one of overlapping functions or conditions of the video codec relative to the first subset of the set of validation tests.

19. The method of claim 18, wherein the set of validation tests includes a third subset of the set of validation tests, one or more validation tests of the third subset of the set of validation tests invoke at least one of a unique function or condition of the video codec, and the first subset of the set of validation tests is smaller than the third subset of the set of validation tests.

20. The method of claim 19, including:
identifying a preferred function or condition of the video codec to invoke, wherein the first subset of the set of validation tests includes the preferred function or condition of the video codec, and the third subset of the set of validation tests includes at least one other function or condition of the video codec in addition to the preferred function or condition of the video codec.

* * * * *